(12) United States Patent
Bando et al.

(10) Patent No.: US 10,897,156 B2
(45) Date of Patent: Jan. 19, 2021

(54) POWER TRANSMITTER

(71) Applicant: IHI Corporation, Tokyo (JP)

(72) Inventors: Takayoshi Bando, Tokyo (JP); Jun Araki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 184 days.

(21) Appl. No.: 16/069,188

(22) PCT Filed: Dec. 6, 2016

(86) PCT No.: PCT/JP2016/086194
§ 371 (c)(1),
(2) Date: Jul. 11, 2018

(87) PCT Pub. No.: WO2017/141522
PCT Pub. Date: Aug. 24, 2017

(65) Prior Publication Data
US 2019/0006886 A1    Jan. 3, 2019

(30) Foreign Application Priority Data

Feb. 16, 2016 (JP) ................................. 2016-026948

(51) Int. Cl.
*H02J 17/00* (2006.01)
*H02J 50/12* (2016.01)
*H02J 50/90* (2016.01)
*B60L 53/122* (2019.01)
(Continued)

(52) U.S. Cl.
CPC ............ *H02J 50/12* (2016.02); *B60L 53/122* (2019.02); *B60L 53/126* (2019.02); *H02J 50/90* (2016.02); *H02M 7/5387* (2013.01); *Y02T 10/70* (2013.01)

(58) Field of Classification Search
CPC ........... H02J 50/90; H02J 50/12; B60L 53/12; H02M 7/5387; Y02T 10/7005
See application file for complete search history.

(56) References Cited

U.S. PATENT DOCUMENTS

| 2011/0018360 A1* | 1/2011 | Baarman | H02J 7/0027 |
| | | | 307/104 |
| 2012/0112553 A1* | 5/2012 | Stoner, Jr. | H02J 5/005 |
| | | | 307/104 |

(Continued)

FOREIGN PATENT DOCUMENTS

| JP | 2013-027081 A | 2/2013 |
| JP | 2013-183497 A | 9/2013 |

(Continued)

*Primary Examiner* — Jared Fureman
*Assistant Examiner* — Esayas G Yeshaw
(74) *Attorney, Agent, or Firm* — Volpe Koenig (57) ABSTRACT

According to the present disclosure, a power transmitter includes a first coil configured to wirelessly transmit power to a second coil of a power receiver, a direct current (DC)/alternating current (AC) converter configured to convert DC power into AC power and supply the AC power to the first coil, and a controller configured to perform frequency control for selecting a frequency of the AC power. The controller at least selects the frequency so that the DC power is less than or equal to withstand power of the DC/AC converter regardless of an amount of misalignment of the second coil with respect to the first coil.

9 Claims, 9 Drawing Sheets (51) Int. Cl.
    *B60L 53/126*    (2019.01)
    *H02M 7/5387*    (2007.01)

(56) References Cited

U.S. PATENT DOCUMENTS

| | | | |
|---|---|---|---|
| 2013/0193276 A1* | 8/2013 | Hunter | B61L 25/025 246/122 R |
| 2014/0300196 A1 | 10/2014 | Bunsen | |
| 2015/0028691 A1 | 1/2015 | Yamauchi et al. | |
| 2015/0048688 A1 | 2/2015 | Yamakawa et al. | |
| 2015/0061580 A1 | 3/2015 | Yamakawa et al. | |
| 2015/0180286 A1 | 6/2015 | Asanuma et al. | |
| 2015/0372502 A1* | 12/2015 | Murayama | H02J 7/025 307/104 |
| 2016/0380485 A1 | 12/2016 | Murayama | |
| 2017/0008385 A1* | 1/2017 | Fujimoto | B60K 7/0007 |
| 2017/0040843 A1* | 2/2017 | Asanuma | H02J 7/025 |
| 2017/0317536 A1* | 11/2017 | Marson | H02J 50/10 |

FOREIGN PATENT DOCUMENTS

| | | |
|---|---|---|
| JP | 2013-192326 A | 9/2013 |
| JP | 2013-211932 A | 10/2013 |
| JP | 2013-211933 A | 10/2013 |
| JP | 2013-225962 A | 10/2013 |
| JP | 2014-204603 A | 10/2014 |
| JP | 2015-073380 A | 4/2015 |
| JP | 2015-136281 A | 7/2015 |
| JP | 2015-228738 A | 12/2015 |
| WO | 2013/137054 A1 | 9/2013 |

* cited by examiner

POWER TRANSMITTER

TECHNICAL FIELD

The present disclosure relates to a power transmitter.

BACKGROUND ART

In Patent Document 1 and Patent Document 2 are known as wireless power supply devices or systems. The device described in Patent Document 1 includes a power transmission circuit configured to supply power from a power source to a power transmission coil, a measurement means configured to measure a current flowing through the power transmission circuit or a voltage of the power transmission circuit, and a detection means configure to detect that a power reception coil is inside or outside a range in which power transmission is possible. Specifically, the position of the power reception coil is detected using a change in a voltage or a current of alternating current (AC) power output from an inverter of a power supply device.

The system described in Patent Document 2 includes an inverter unit configured to convert a direct current (DC) voltage into an AC voltage of a predetermined frequency and output the AC voltage, a power transmission antenna to which the AC voltage from the inverter unit is input, and a power transmission control unit configured to control the frequency of the AC voltage output by the inverter unit. The power transmission control unit determines a transmission frequency when electric energy is transmitted from the power transmission antenna.

CITATION LIST

Patent Literature

[Patent Document 1] Japanese Unexamined Patent Publication No. 2015-73380
[Patent Document 2] Japanese Unexamined Patent Publication No. 2013-211933

SUMMARY OF INVENTION

Technical Problem

In a wireless power feeding system, a power transmitter and a power receiver include a coil, a capacitor connected to the coil, and the like. Impedances of these elements vary with a frequency of an AC power output from a DC/AC converter. A frequency of the AC power is variable. When the device of Patent Document 1 detects a position of a power reception coil, the impedance of the entire wireless power feeding system varies with a value of the frequency of the AC power output from the DC/AC converter. As a result, input power of the DC/AC converter changes.

Also, according to a combination of a frequency and an amount of misalignment, the impedance when viewing a power reception side from the DC/AC converter may become capacitive. In this case, a switching scheme of the DC/AC converter becomes a hard switching scheme. The switching loss in the hard switching scheme is large and the input power of the DC/AC converter is high. Then, this input power may exceed withstand power of the DC/AC converter. To increase the withstand power of the DC/AC converter, it is conceivable to adopt an element with high withstand power as a constituent element of the DC/AC converter. However, there is a problem in that the size of the DC/AC converter is increased.

The present disclosure describes a power transmitter in which a size of a DC/AC converter is not caused to be increased and in which input power of the DC/AC converter does not exceed withstand power of the DC/AC converter even when a second coil of a power reception side is located at any position with respect to a first coil of a power transmission side.

Solution to Problem

According to an aspect of the present disclosure, a power transmitter for supplying a power receiver with power includes a first coil configured to wirelessly transmit power to a second coil of the power receiver; a DC/AC converter configured to convert DC power into AC power and supply the AC power to the first coil; and a controller configured to perform frequency control for selecting a frequency of the AC power, wherein the controller at least selects the frequency so that the DC power is less than or equal to withstand power of the DC/AC converter regardless of an amount of misalignment of the second coil with respect to the first coil.

Effects of Invention

According to an aspect of the present disclosure, a size of a DC/AC converter is not increased and DC power input to the DC/AC converter does not exceed withstand power of the DC/AC converter.

DESCRIPTION OF EMBODIMENTS

According to an aspect of the present disclosure, a power transmitter for supplying a power receiver with power includes a first coil configured to wirelessly transmit power to a second coil of the power receiver; a direct current (DC)/alternating current (AC) converter configured to convert DC power into AC power and supply the AC power to the first coil; and a controller configured to perform frequency control for selecting a frequency of the AC power, wherein the controller at least selects the frequency so that the DC power is less than or equal to withstand power of the DC/AC converter regardless of an amount of misalignment of the second coil with respect to the first coil.

Generally, the amount of misalignment of the second coil with respect to the first coil can be any value. For example, there is a case in which the second coil is close to face the first coil and there is also a case in which the first coil and the second coil may be separated so that magnetic coupling between the first coil and the second coil is negligible. In the latter case, because the second coil has no influence on the operation of the power transmitter, this is the same as the absence of the second coil. If there is no second coil, the impedance when viewing the power receiver side from the DC/AC converter may become capacitive. This case becomes a hard switching scheme, resulting in an increase in DC power. Here, the present inventors have found that there is a difference in a correlation between the frequency of the AC power and the DC power in accordance with a magnitude of an amount of misalignment. It is known that the correlation is determined on the basis of a circuit topology of the first coil. According to the power transmitter related to an aspect, the controller performs frequency control on the DC/AC converter at a frequency at which the DC power becomes less than or equal to the withstand power of the DC/AC converter regardless of the amount of misalignment. Because the frequency control is performed so that the DC power is less than or equal to the withstand power of the DC/AC converter regardless of any amount of misalignment (for example, even when there is no second coil), it is possible to prevent a size of the DC/AC converter from being increased.

In some aspects, the power transmitter further includes a detector configured to detect an electrical parameter within the power transmitter, wherein the controller selects a frequency at which a detected value of the electrical parameter increases or decreases as the amount of misalignment increases. In this case, directionality corresponds to a change in an amount of misalignment and a change in an electrical parameter. It is possible to easily determine whether or not the second coil is located in a desired range on the basis of a correspondence relationship and a detected value.

The power transmitter further includes a power converter configured to convert power supplied from a power source into the DC power, wherein the controller performs voltage adjustment control for causing a voltage of the DC power to be decreased in addition to the frequency control so that the DC power is less than or equal to the withstand power of the DC/AC converter regardless of the amount of misalignment of the second coil with respect to the first coil. Even if the DC power cannot be sufficiently suppressed by the frequency control, it is possible to reliably set the DC power to power less than or equal to the withstand power by the controller's performing the voltage adjustment control. If a selection range of a frequency range is limited, reliable and flexible control can be performed using such voltage adjustment control together with the frequency control.

In some aspects, the controller pre-stores a correspondence relationship between the amount of misalignment and a detected value of the electrical parameter as a table and estimates the amount of misalignment corresponding to the detected value by referring to the table. In this case, it is possible to estimate not only whether the second coil is located in a desired range, but also to estimate an amount of misalignment.

In some aspects, the power transmitter further includes a smoothing capacitor provided at an input of the DC/AC converter, wherein the controller performs the frequency control before the smoothing capacitor is fully charged. In this case, it is possible to determine whether the second coil is located in a desired range with effectively using a time before an operation of charging a load starts.

Hereinafter, an embodiment of the present disclosure will be described with reference to the drawings. The same elements are denoted by the same reference signs in the description of the drawings and redundant description thereof will be omitted.

Figure 1:
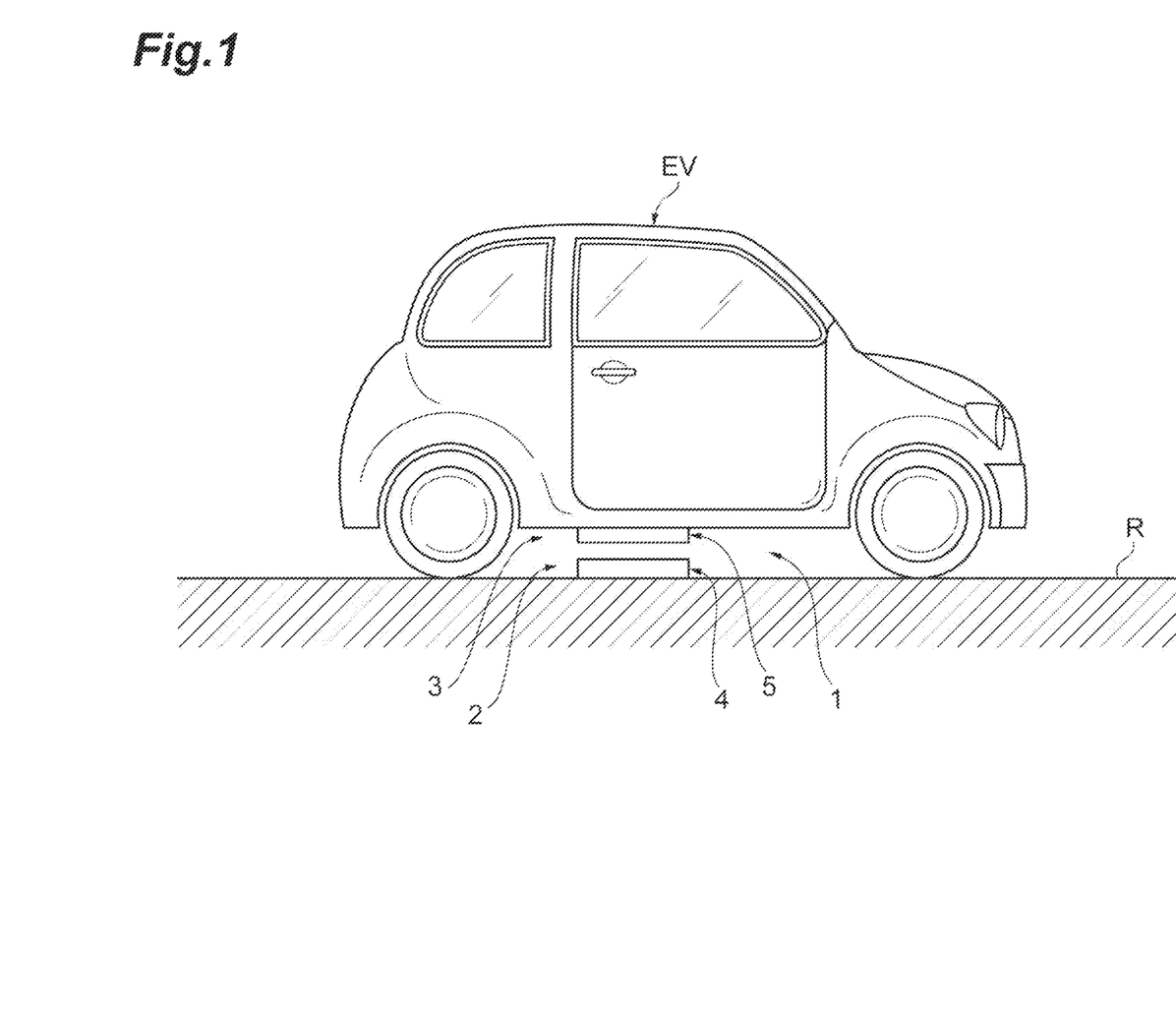
FIG. 1 is a diagram illustrating an example in which a power transmitter and a wireless power feeding system are applied according to an embodiment of the present disclosure.
Figure 2:
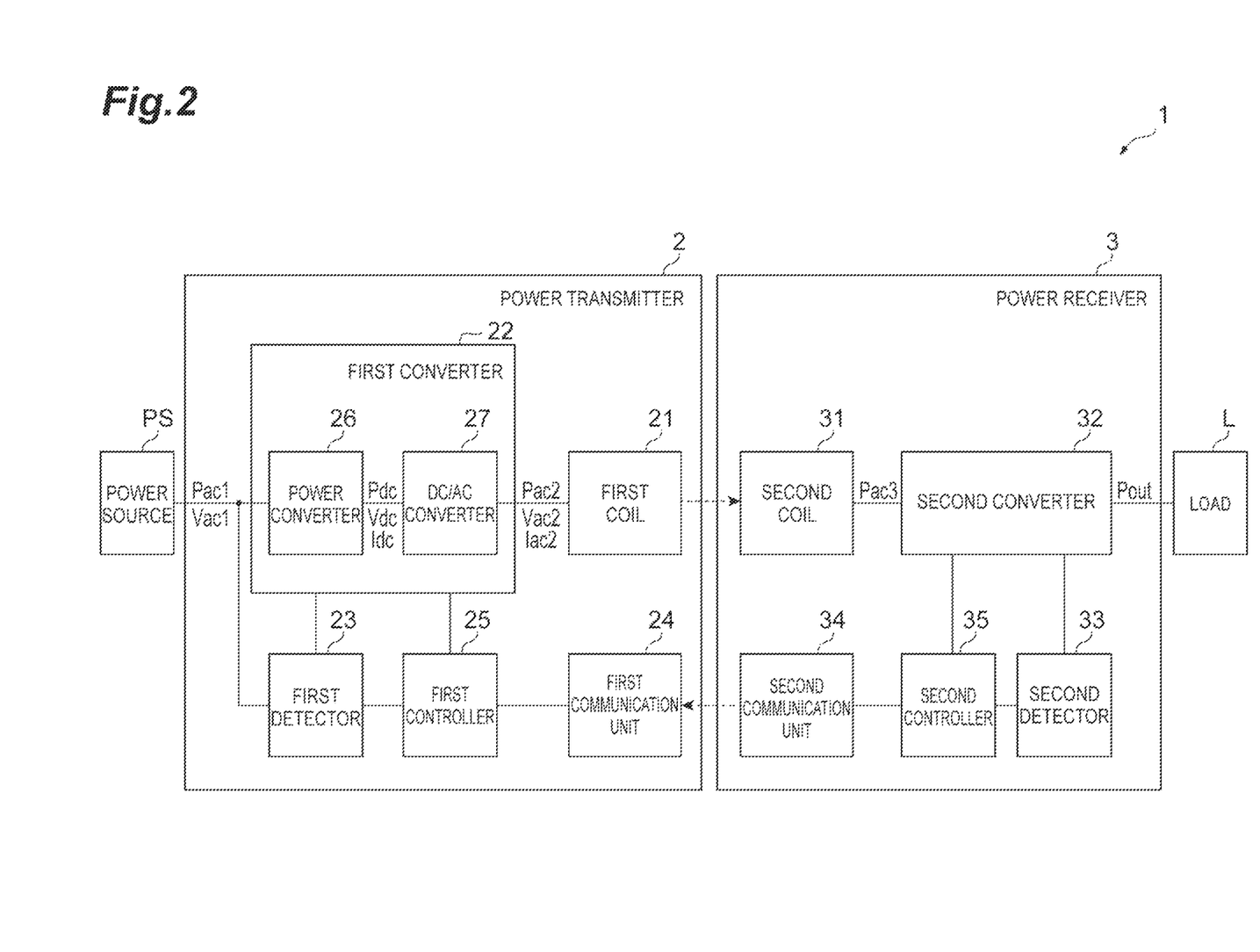
FIG. 2 is a circuit block diagram of the wireless power feeding system in FIG. 1.

As illustrated in FIGS. 1 and 2, the wireless power feeding system 1 includes a power transmitter 2 and a power receiver 3 and is a system for supplying power (electric power) from the power transmitter 2 to the power receiver 3. The power transmitter 2 and the power receiver 3 are separated, for example, in an up-down direction. For example, the power transmitter 2 is installed in a parking lot. For example, the power receiver 3 is mounted in an electric vehicle EV. The wireless power feeding system 1 is configured to supply electric power to the electric vehicle EV arriving at the parking lot or the like by using magnetic coupling between coils in a magnetic field resonance scheme, an electromagnetic induction scheme, or the like.

The power transmitter 2 is a device configured to supply power for wireless power feeding. The power transmitter 2 generates desired AC power from power supplied by a power source PS and transmits the generated AC power to the power receiver 3. For example, the power transmitter 2 is installed on a road surface R of a parking lot or the like. For example, the power transmitter 2 includes a power transmission coil device 4 provided to project upward from the road surface R of the parking lot or the like. The power transmission coil device 4 includes a first coil 21, and has, for example, a flat frustum shape or a rectangular parallelepiped shape. The power transmitter 2 generates desired AC power from the power source PS. The generated AC power is transmitted to the power transmission coil device 4, so that the power transmission coil device 4 causes a magnetic flux to be generated.

The power receiver 3 is a device configured to receive power from the power transmitter 2 and supply power to a load L. For example, the power receiver 3 is mounted in the electric vehicle EV. For example, the power receiver 3 includes a power reception coil device 5 attached to a bottom surface of a body (a chassis or the like) of the electric vehicle EV. The power reception coil device 5 includes the second coil 31 and faces the power transmission coil device 4 while being spaced apart from the power transmission coil device 4 in an up-down direction during power supply. For example, the power reception coil device 5 has a flat frustum shape or a rectangular parallelepiped shape. The magnetic flux generated by the power transmission coil device 4 is interlinked with the power reception coil device 5, so that the power reception coil device 5 generates an induced current. Thereby, the power reception coil device 5 wirelessly receives power from the power transmission coil device 4. The power received by the power reception coil device 5 is supplied to the load L.

A circuit configuration of the wireless power feeding system 1 will be described with reference to FIG. 2. As illustrated in FIG. 2, the wireless power feeding system 1 is a system configured to receive AC power Pac1 from the power source PS and supply load power Pout to the load L. The power source PS is an AC power source such as a commercial power source and supplies the AC power Pac1 to the power transmitter 2. A frequency of the AC power Pac1 is, for example, 50 Hz or 60 Hz. The load L may be a DC load such as a battery or an AC load such as a motor.

The power transmitter 2 is supplied with the AC power Pac1 from the power source PS. The power transmitter 2 includes a first coil 21, a first converter 22, a first detector 23 (a detector), a first communication unit 24, and a first controller 25 (a controller).

The first converter 22 is a circuit configured to convert the AC power Pac1 supplied from the power source PS into desired AC power Pac2 and supply the AC power Pac2 obtained through conversion to the first coil 21. For example, the first converter 22 can change a magnitude of the AC power Pac1 or the DC power Pdc through frequency control and voltage adjustment control to be described below. The first converter 22 includes a power converter 26 and a DC/AC converter 27.

The power converter 26 is an AC/DC converter configured to convert the AC power Pac1 supplied from the power source PS into the DC power Pdc. The power converter 26 is, for example, a rectification circuit. The rectification circuit may include a rectification element such as a diode or may include a switching element such as a transistor. The power converter 26 may further have a power factor correction (PFC) function and a step-up/step-down function. The power converter 26 is controlled by the first controller 25 so that a magnitude of a voltage Vdc of the DC power Pdc is changed. For example, the power converter 26 changes the magnitude of the voltage Vdc of the DC power Pdc in pulse width modulation. The power converter 26 supplies the DC power Pdc obtained through conversion to the DC/AC converter 27.

The DC/AC converter 27 converts the DC power Pdc obtained through the conversion by the power converter 26 into the AC power Pac2. For example, a frequency of the AC power Pac2 is 81.38 kHz to 90 kHz. The DC/AC converter 27 is, for example, an inverter circuit. The first converter 22 may further include a transformer provided at an output of the DC/AC converter 27. The DC/AC converter 27 is controlled by the first controller 25 so that the frequency of the AC power Pac2 is changed. The DC/AC converter 27 supplies the AC power Pac2 obtained through conversion to the first coil 21.

The first coil 21 is a coil for wirelessly supplying power to the power receiver 3. The first coil 21 is supplied with the AC power Pac2 from the first converter 22 and therefore generates a magnetic flux. A capacitor and an inductor (for example, a reactor) may be connected between the first coil 21 and the first converter 22. The capacitor and the inductor (hereinafter also referred to as a resonance capacitor and a resonance inductor) are connected in parallel or in series to the first coil 21, and various circuit topologies are formed.

The first detector 23 includes a circuit for acquiring a measured value related to the DC power Pdc or the AC power Pac1. The circuit for acquiring the measured value related to the DC power Pdc or the AC power Pac1 is, for example, a voltage sensor, a current sensor, or a combination thereof. The first detector 23 measures the DC power Pdc, a voltage Vdc of the DC power Pdc or a current Idc of the DC power Pdc. Also, the first detector 23 measures the AC power Pac1, a voltage Vac1 of the AC power Pac1, or a current of the AC power Pac1. The first detector 23 outputs the acquired measured values to the first controller 25.

The first communication unit 24 is a circuit for wirelessly communicating with the second communication unit 34 of the power receiver 3 to be described below. For example, the first communication unit 24 includes an antenna for a communication scheme using radio waves and a light emitting element and a light receiving element for a communication scheme using optical signals. The first communication unit 24 outputs information received from the power receiver 3 to the first controller 25.

The first controller 25 includes processing devices such as a central processing unit (CPU) and a digital signal processor (DSP). The first controller 25 may include a read only memory (ROM), a random access memory (RAM), an interface circuit connected to each part of the power transmitter 2, and the like.

The first controller 25 controls the magnitude of the AC power Pac1 or the DC power Pdc by controlling the first converter 22 in executing the power transmission control. Specifically, the first controller 25 performs at least frequency control on the DC/AC converter 27. The frequency control described herein is a function of selecting a frequency of the AC power Pac2 output from the DC/AC converter 27 and supplying a drive signal to the DC/AC converter 27 at the selected frequency (also referred to as a drive frequency). The drive frequency may be a value within the selectable range (for example, from 81.38 kHz to 90 kHz). The frequency of the AC power Pac2 is a frequency of a voltage Vac2 or a current Iac2 of the AC power Pac2 output from the first converter 22. The frequency selection by the DC/AC converter 27 includes active selection from a selectable range by the DC/AC converter 27 and adoption of a frequency pre-selected from the selectable range by the DC/AC converter 27.

In addition to the frequency control, the first controller 25 may perform the voltage adjustment control on the power converter 26. The first controller 25 further performs a determination process of determining whether or not the second coil 31 is located in a desired range with respect to the first coil 21. Details of the frequency control and the determination process in the first controller 25 will be described below.

The power receiver 3 includes the second coil 31, a second converter 32, a second detector 33, the second communication unit 34, and a second controller 35.

The second coil 31 is a coil for receiving power wirelessly supplied from the power transmitter 2. A magnetic flux generated by the first coil 21 is interlinked with the second coil 31, so that AC power Pac3 is generated in the second coil 31. The second coil 31 supplies the AC power Pac3 to the second converter 32. Also, a capacitor and an inductor (for example, a reactor) may be connected between the second coil 31 and the second converter 32. The capacitor and the inductor are connected in parallel or in series to the second coil 31, and various circuit topologies are formed.

The second converter 32 is a circuit for converting the AC power Pac3 received by the second coil 31 into desired load power Pout for the load L. If the load L is a DC load, the second converter 32 is an AC/DC converter (a rectification circuit) configured to convert the AC power Pac3 into the DC load power Pout. In this case, the second converter 32 may include a step-up/step-down function of outputting the desired load power Pout for the load L. This step-up/down function can be implemented by, for example, a chopper circuit or a transformer. The second converter 32 may further include a transformer provided at the input of the AC/DC converter.

If the load L is an AC load, the second converter 32 further includes a DC/AC converter (an inverter circuit) in addition to an AC/DC converter configured to convert the AC power Pac3 into DC power. The DC/AC converter converts the DC power obtained through conversion by the AC/DC converter into AC load power Pout. The second converter 32 may further include a transformer provided at the input of the AC/DC converter. If the AC power Pac3 supplied from the second coil 31 is desired AC power for the load L, the second converter 32 can be omitted.

The second detector 33 is a circuit for acquiring a measured value related to the load power Pout supplied to the load L. The second detector 33 measures a load voltage, a load current, or the load power Pout that is supplied to the load L. The second detector 33 is, for example, a voltage sensor, a current sensor, or a combination thereof. The second detector 33 outputs the acquired measured value to the second controller 35. The load L outputs a power command value to the second controller 35. The power command value indicates a magnitude of the desired power to be supplied to the load L. For example, if the load L is a storage battery, the power command value may be a command value of a current, a voltage, or power determined in accordance with a state of charge (SOC) of the load L.

The second communication unit 34 is a circuit for wirelessly communicating with the first communication unit 24 of the power transmitter 2. Through the second communication unit 34, the power receiver 3 can communicate with the power transmitter 2. For example, the second communication unit 34 includes an antenna for a communication scheme using radio waves and a light emitting element and a light receiving element for a communication scheme using optical signals. The second communication unit 34 transmits information received from the second controller 35 to the power transmitter 2.

The second controller 35 includes processing devices such as a CPU and a DSP. The second controller 35 may include a ROM, a RAM, an interface circuit connected to each part of the power receiver 3, and the like. The second controller 35 transmits a measured value received from the second detector 33 and a power command value received from the load L to the power transmitter 2 via the second communication unit 34.

For example, when a storage battery of an electric vehicle is connected to the power transmitter 2 instead of the power source PS and the power source PS is connected to the power receiver 3 instead of the load L, power can also be transmitted from the power receiver 3 to the power transmitter 2.

Next, a configuration and a function of the first controller 25 in the power transmitter 2 will be described in detail. As described above, the first controller 25 controls a magnitude of the AC power Pac1 or the DC power Pdc by performing frequency control on the DC/AC converter 27. The first controller 25 performs a determination process of determining whether or not the second coil 31 is located in a desired range with respect to the first coil 21. In the power transmitter 2 of the wireless power feeding system 1, it is determined whether or not the second coil 31 is located in a desired range in a state in which it is unclear whether the power receiver 3, i.e., the second coil 31, is located in the vicinity of the first coil 21 or whether the second coil 31 is located far from the first coil 21.

The desired range is a predetermined misalignment range in which predetermined power efficiency can be satisfied. The desired range is a range of the amount of misalignment in which, when the power efficiency is measured by changing a misalignment in advance, the power efficiency of a certain level or higher is obtained. As another example of the desired range, for example, it is also possible to set the range of the amount of misalignment in which the reduction of the power efficiency with respect to the maximum power efficiency is within 5% or 10%. The power efficiency indicates a ratio of electric power at a certain position within the power receiver to electric power at a certain position within the power transmitter. The power efficiency is, for example, a ratio of power of an output of the rectifier (the second converter 32) of the power receiver 3 (i.e., the load power Pout) to power of an input of the DC/AC converter 27 of the power transmitter 2 (i.e., the DC power Pdc). Also, the desired range may be designated as a range of the amount of misalignment in which the power receiver 3 can supply predetermined power (for example, 3 kW) to the load L connected to the power receiver 3 instead of the predetermined power efficiency.

Further, another example of the desired range is a range described in a specification sheet or a user manual of the wireless power feeding system 1 or the like from the viewpoint of a predetermined mode of use of the wireless power feeding system 1. The desired range can vary with a type or a vehicle class of electric vehicle EV or the like. For example, numerical values such as 100 mm in a front-rear direction and 200 mm in a left-right direction may be cited. In this case, it is considered that "Please use a wireless power feeding system in which misalignment is in a range of 100 mm in the front-rear direction and 200 mm in the left-right direction or the like" is described in the user manual.

Figure 3:
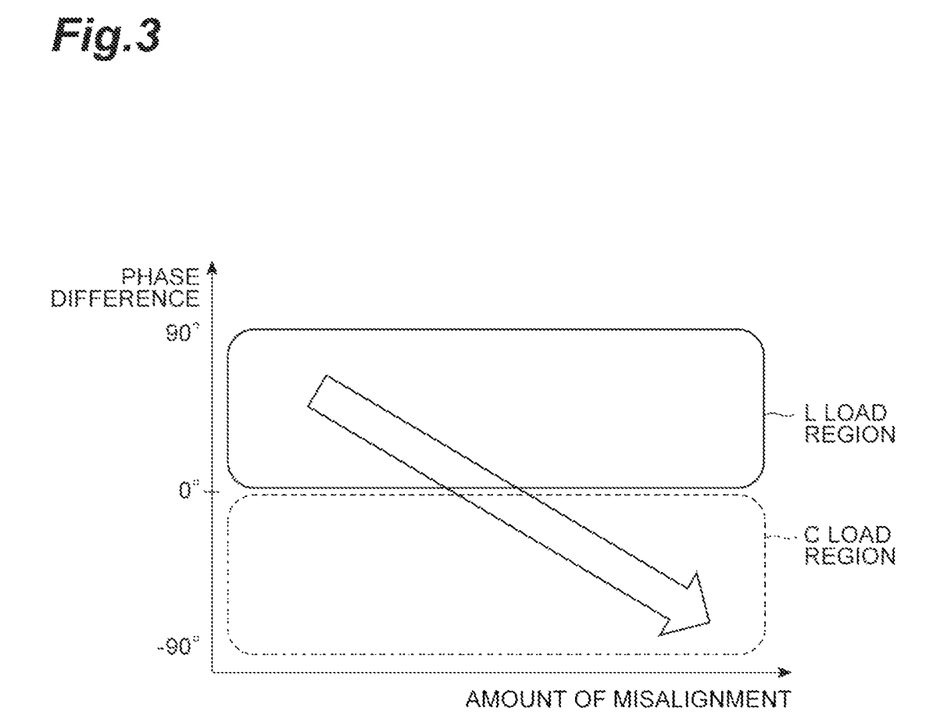
FIG. 3 is a diagram illustrating an example of a relationship between an amount of misalignment and a phase difference.

Here, the impedance when viewing the power receiver 3 from the DC/AC converter 27 (an output of the DC/AC converter 27) can be inductive or capacitive. A change in the above-described impedance and protection of the DC/AC converter 27 will be described with reference to FIG. 3. FIG. 3 is a diagram illustrating an example of a relationship between an amount of misalignment of the second coil 31 with respect to the first coil 21 and a phase difference. A vertical axis of FIG. 3 is a phase difference. The phase difference is a difference between a phase of an output voltage (the voltage Vac2 of the AC power Pac2) and a phase of an output current (the current Iac2 of the AC power Pac2) from the DC/AC converter 27. When the phase of the output voltage is ahead of the phase of the output current, the phase difference becomes positive. In other words, a phase lag of the output current with respect to the phase of the output voltage becomes positive.

In the example of FIG. 3, when the amount of misalignment is small, i.e., when the power transmission coil device 4 and the power reception coil device 5 are relatively opposite to each other, the phase difference is maximum. In this manner, if the phase of the output voltage is ahead of the phase of the output current, the impedance is inductive. If the amount of misalignment is large, i.e., if the power reception coil device 5 is away from the power transmission coil device 4, the phase difference becomes small. In this manner, if the phase of the output voltage is behind the phase of the output current, the impedance is capacitive. If the phase difference is in a range in which the phase difference is greater than 0° and less than or equal to 90°, the impedance becomes inductive (L load) and this range is an L load region. Also, when the phase difference is in a range in which the phase difference is less than 0° and greater than or equal to −90°, the impedance is capacitive (C load) and this range is a C load region.

In the power transmitter 2, the operation mode in the L load is a regular operation and the operation mode in the C load is generally undesirable. This is because a strain on the power transmitter 2 is significantly large in the case of the C load. Specifically, in the C load region, the DC/AC converter 27 has a hard switching scheme and the switching loss increases. Thus, the power (DC power Pdc or AC power Pac1) input to the DC/AC converter 27 increases and the load on the DC/AC converter 27 increases. In the example illustrated in FIG. 3, the phase difference decreases as the amount of misalignment increases, so that the power may increase. Thus, even when a C load can occur, it is necessary to eliminate a strain on the DC/AC converter 27.

When the impedance becomes capacitive, the first controller 25 performs frequency control to prevent the DC power Pdc for the DC/AC converter 27 from exceeding the withstand power. Hereinafter, a relationship between a frequency and power of the power transmitter or a phase difference will be described with reference to FIGS. 4 and 5. The inventors of the present invention have found that there is a difference in a correlation between the frequency of the AC power Pac2 and the frequency of the DC power Pdc or the AC power Pac1 (hereinafter, the DC power Pdc or the AC power Pac1 is also referred to as input power) in accordance with the magnitude of the amount of misalignment. The correlation can be determined on the basis of the circuit topology of the first coil 21. In other words, such a correlation can be uniquely obtained even when the circuit configuration of the first coil 21 is in any format or form as long as its circuit configuration is clear. The correlation can be determined by those skilled in the art on the basis of its circuit configuration.

Figure 4A:
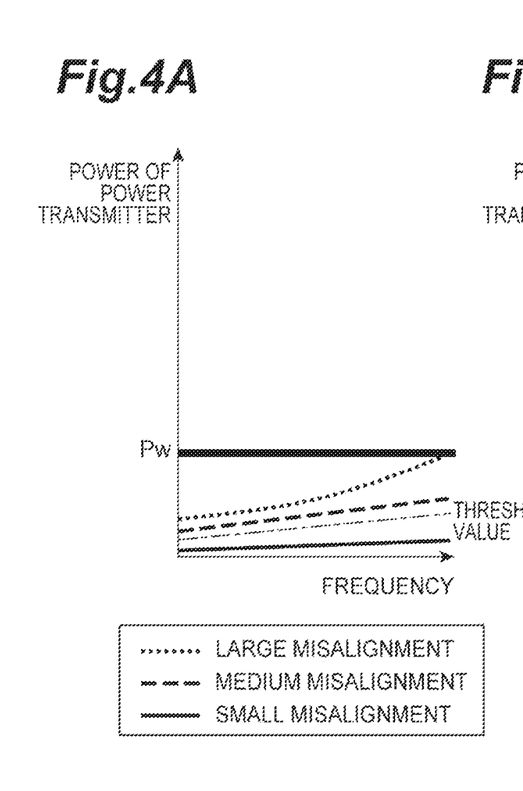
FIGS. 4A to 4C are diagrams illustrating relationships of power of a power transmitter with respect to different frequencies.
Figure 4B:
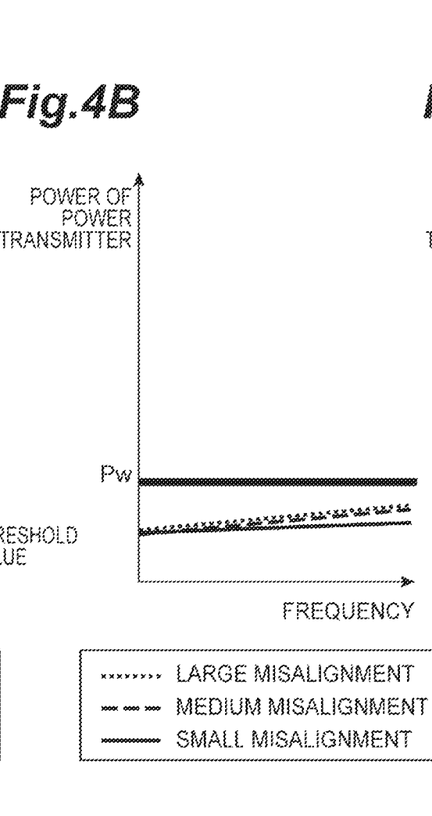
Figure 4C:
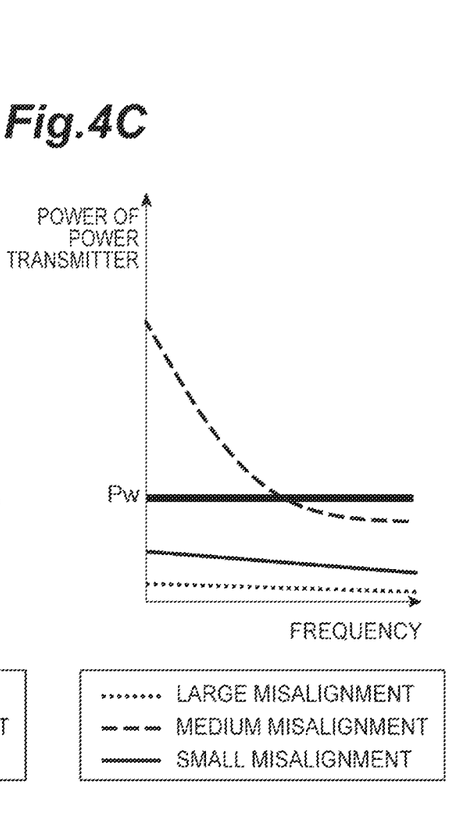

FIGS. 4A to 4C illustrate relationships of power of the power transmitter with respect to different frequencies. The horizontal axis represents a frequency of the AC power Pac2 (i.e., the drive frequency), and the vertical axis represents the power of the power transmitter (i.e., the DC power Pdc or the AC power Pac1). These frequencies are similar to the frequency ranges described above and are frequencies in the range of about 80 kHz to 90 kHz. In FIGS. 4A to 4C, withstand power Pw, which is a threshold value for the electric power that becomes a strain on the DC/AC converter 27, is also shown. This withstand power Pw is a threshold value in the case of the C load. A target to be directly compared with the withstand power Pw is the DC power Pdc, but the AC power Pac1 may be compared with the withstand power Pw. The AC power Pac1 is a power loss value of the power converter 26 higher than the DC power Pdc. Thus, if the AC power Pac1 is less than or equal to the withstand power Pw, the DC power Pdc reliably becomes less than or equal to the withstand power Pw.

In the frequency range illustrated in FIG. 4A, directionality of the power change with respect to the amount of misalignment is constant. When the amount of misalignment becomes small, medium and large, the electric power increases. Even in the frequency range illustrated in FIG. 4B, the electric power increases as the amount of misalignment increases. However, as compared with the frequency range illustrated in FIG. 4A, a power difference between different misalignments is small. In the frequency ranges illustrated in FIG. 4A and FIG. 4B, the electric power is always less than the withstand power Pw. In the frequency range illustrated in FIG. 4C, the directionality of the power change with respect to the amount of misalignment is not constant. Electric power increases in the order of a large amount of misalignment, a small amount of misalignment, and a medium amount of misalignment. Also, a range of a low frequency at which the amount of misalignment is medium is excluded and the electric power is less than the withstand power Pw.

Figures 5A, 5B:
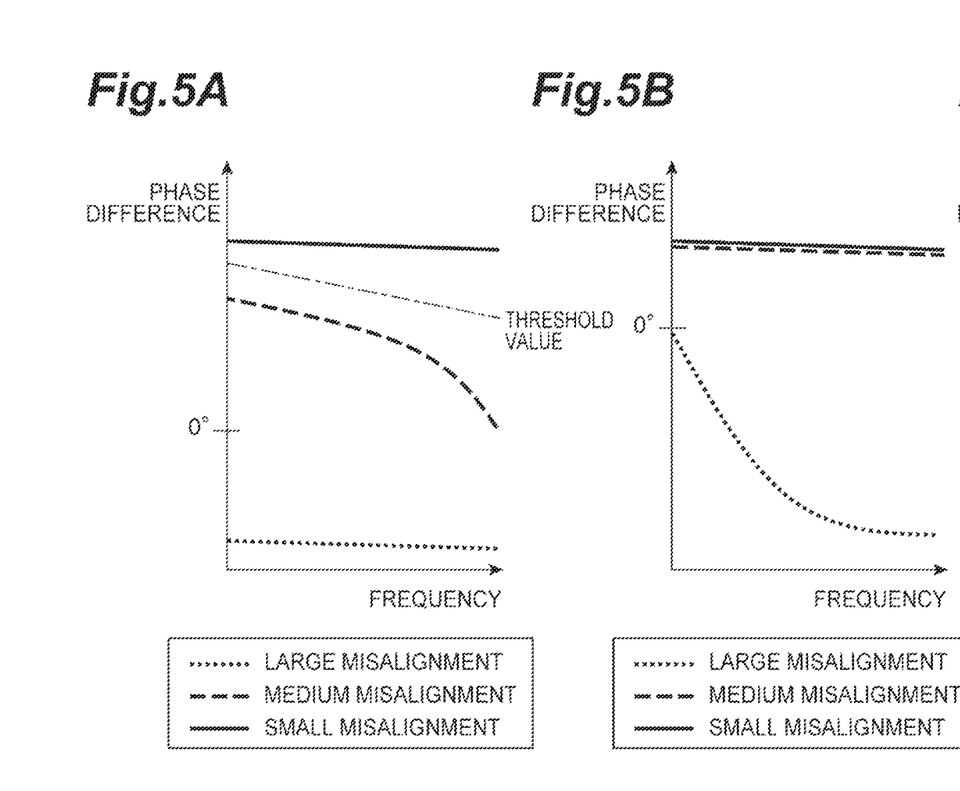
FIGS. 5A to 5C are diagrams illustrating relationships of phase differences with respect to different frequencies.
Figure 5C:
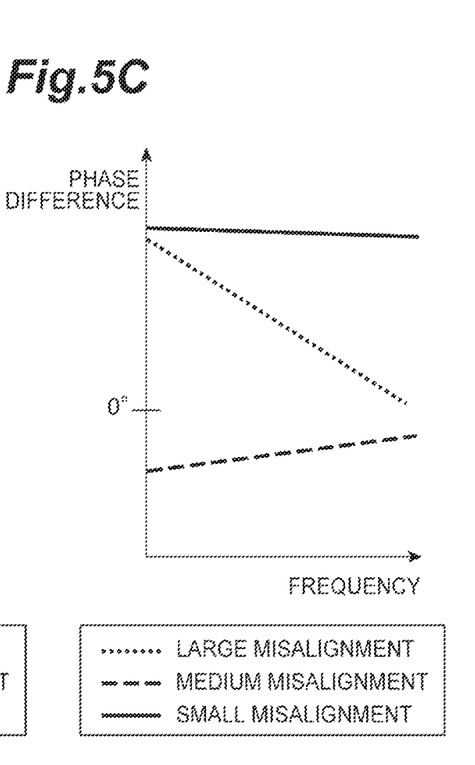

FIGS. 5A to 5C illustrate relationships of phase differences with respect to different frequencies. The horizontal axis represents a frequency of the AC power Pac2 (i.e., the drive frequency), and the vertical axis represents a phase difference (i.e., a difference between the phase of the voltage Vac2 and the phase of the current Iac2). The frequency ranges illustrated in FIGS. 5A to 5C correspond to the frequency ranges illustrated in FIGS. 4A to 4C, respectively.

In the frequency range illustrated in FIG. 5A, the directionality of the power change with respect to the amount of misalignment is constant. When the amount of misalignment becomes small, medium, and large, the phase difference decreases. Even in the frequency range illustrated in FIG. 5B, the phase difference decreases as the amount of misalignment increases. However, as compared with the frequency range illustrated in FIG. 5A, a phase difference between different misalignments is small. In the frequency range illustrated in FIG. 5C, the directionality of the change in the phase difference with respect to the amount of misalignment is not constant. The phase difference decreases in the order of a small amount of misalignment, a large amount of misalignment, and a medium amount of misalignment.

Therefore, the first controller 25 of the power transmitter 2 pre-stores a frequency at which the electric power is less than or equal to the withstand power Pw in the frequency ranges illustrated in FIGS. 4A to 4C as the drive frequency for the DC/AC converter 27. That is, the first controller 25 selects a frequency at which the AC power Pac1 or the DC power Pdc is less than or equal to the withstand power Pw regardless of the amount of misalignment. Here, for the AC power Pac1, an effective value or a peak value may be used. For example, the first controller 25 stores the drive frequency in a memory or the like. The first controller 25 may use one fixed value or a plurality of fixed values as the drive frequency, appropriately select one thereof, and change a drive frequency within a predetermined frequency range. By selecting the drive frequency as described above, the power transmitter 2 protects the DC/AC converter 27 regardless of any amount of misalignment.

Figure 9:
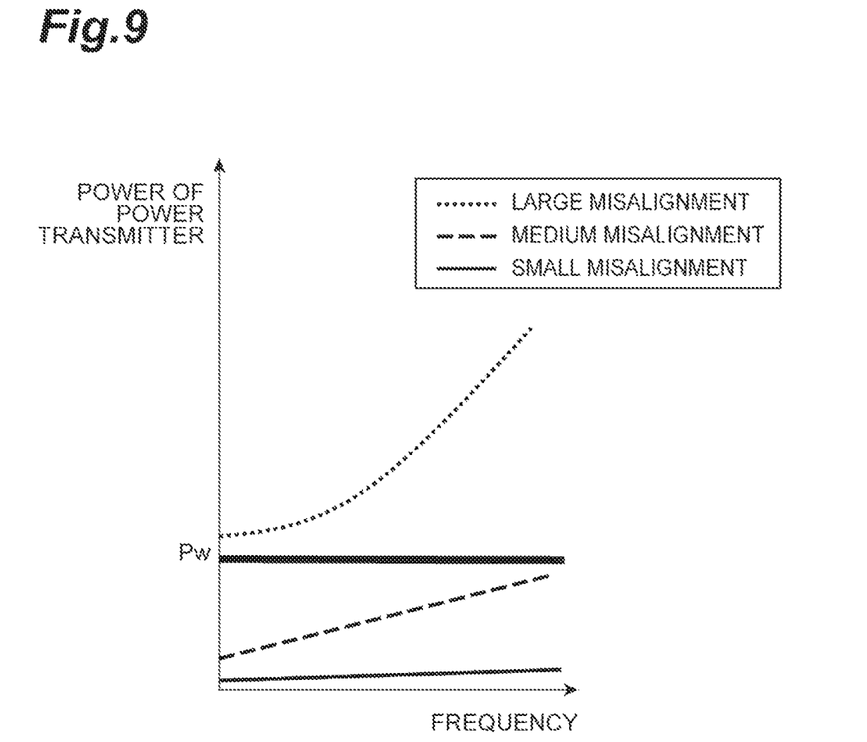
FIG. 9 is a diagram illustrating a relationship of power of the power transmitter with respect to a frequency different from those illustrated in FIGS. 4A to 4C.

In other words, the first controller 25 selects a frequency at which the input power of the DC/AC converter 27 at a misalignment when the phase difference is minimum (the impedance corresponds to the C load) is less than or equal to the withstand power Pw. In the frequency range as illustrated in FIG. 9, the power of the power transmitter always exceeds the withstand power Pw if the amount of misalignment is large. Therefore, the drive frequency cannot be selected from such a frequency range.

Also, if a frequency band having directionality, i.e., regularity, is selected with respect to the amount of misalignment within the characteristics illustrated in FIGS. 4A to 4C and FIGS. 5A to 5C, the first controller 25 stores a threshold value indicating that the second coil 31 is close to a certain extent. For example, if the desired range in which the second coil 31 should be located with respect to the first coil 21 is a range from a case in which a misalignment is "small" to a case in which a misalignment is between "small" and "medium." Here, if there is directionality with respect to power (see FIG. 4A), an intermediate value between power corresponding to a small misalignment and power corresponding to a medium misalignment is stored as a threshold value. If there is directionality with respect to the phase difference (see FIG. 5A), an intermediate value between a phase difference corresponding to the small misalignment and a phase difference corresponding to the medium misalignment is stored as a threshold value. These threshold values are used in a process of determining the position of the second coil 31. The electric power and the phase difference correspond to electrical parameters of the power transmitter 2.

The first controller 25 may pre-store correspondence relationships between the amount of misalignment and power and a phase difference as a table. For example, this table is configured as illustrated in the following Table 1. Also, the table stored in the first controller 25 is not limited to a case in which the power of the power transmitter is used as an electrical parameter. Other electrical parameters may be adopted.

TABLE 1

|  | Power of power transmitter | | |
| --- | --- | --- | --- |
|  | 10 W | 20 W | 50 W |
| Amount of misalignment | 0 cm (negligible) | 10 cm | 20 cm |

As in the example illustrated in FIG. 3, the amount of misalignment is maximized when there is no power receiver 3. A minimum value (0) of the amount of misalignment can indicate a positional relationship between the first coil 21 and the second coil 31 in which maximum power efficiency of the wireless power feeding system 1 is implemented. Also, the minimum value (0) of the amount of misalignment may indicate that the center of the coil surface of the first coil 21 and the center of the coil surface of the second coil 31 coincide in a facing direction. Also, the minimum value (0) of the amount of misalignment may indicate a positional relationship between the first coil 21 and the second coil 31 in which there is no misalignment as defined in a specification sheet or a user manual of the wireless power feeding system 1 or the like. Shifts from these reference positions at which there is no misalignment are assumed to be misalignments.

Figure 6:
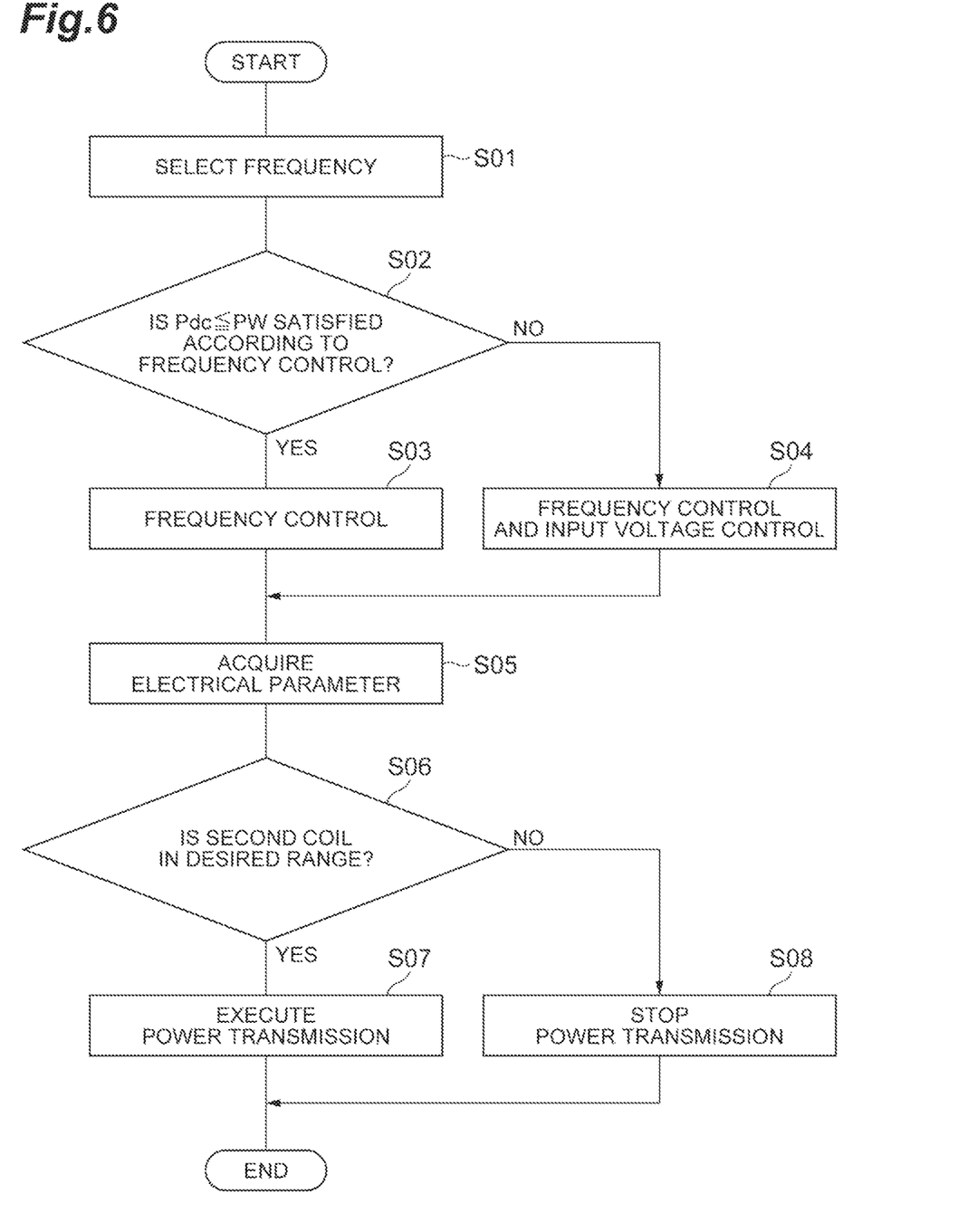
FIG. 6 is a flowchart illustrating a misalignment determination process.

Subsequently, a process executed by the first controller 25 will be described with reference to FIG. 6. This process starts, for example, when the power transmitter 2 receives a signal for inquiring whether or not power transmission is possible from the power receiver 3. The process of the first controller 25 is performed before the supply of predetermined electric power (for example, 3 kW) by the first controller 25.

As described above, the first controller 25 selects a frequency (step S01). Next, the first controller 25 determines whether or not the DC power Pdc (or the AC power Pac1) is less than or equal to the withstand power Pw when the selected frequency is set as the drive frequency (step S02). Here, when a selectable frequency range is present and is limited to a selectable drive frequency, it is difficult to set the DC power Pdc to the withstand power Pw or less even though the DC power Pdc can be reduced to some extent according to selection of the drive frequency.

Figure 8:
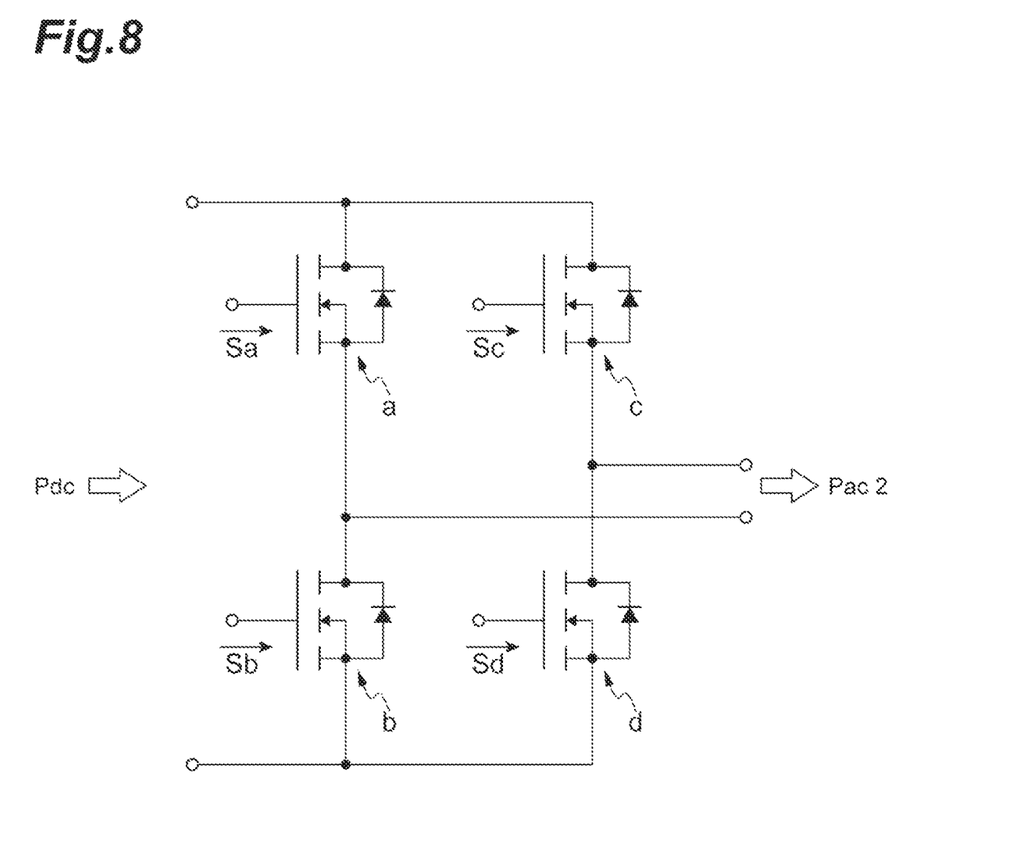
FIG. 8 is a diagram illustrating an example of a circuit configuration of a DC/AC converter.

When it is determined that the DC power Pdc (or the AC power Pac1) is less than or equal to the withstand power Pw in step S02, the first controller 25 outputs a drive signal indicating the drive frequency to the DC/AC converter 27 and performs frequency control (step S03). An example of the frequency control will be described with reference to FIG. 8. For example, if the DC/AC converter 27 is an inverter circuit as illustrated in FIG. 8, the first controller 25 adjusts a timing at which each of switching elements a to d is turned on by adjusting the supply time of drive signals Sa to Sd to switching elements a to d included in the inverter circuit. As a result, the AC power Pac2 of a desired frequency is output. These switching elements a to d include, for example, a field effect transistor (FET), an insulated gate bipolar transistor (IGBT), and the like. In this case, the drive signal is applied to a gate of the switching element. A specific technique of frequency control is not limited to the above method.

Figure 7A:
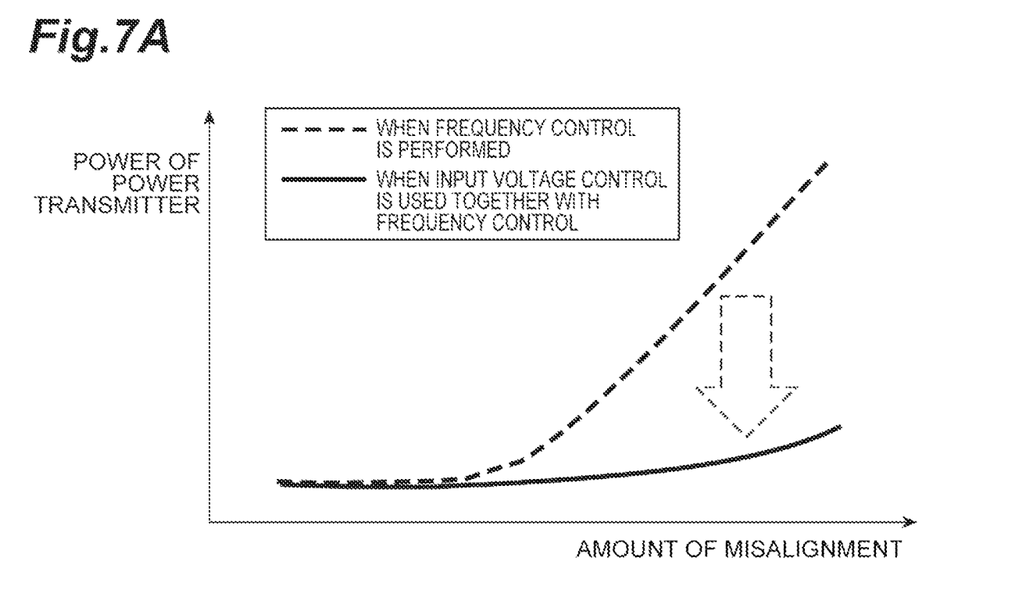
FIG. 7A is a diagram illustrating reduction in power of the power transmitter by voltage control of first DC power and FIG. 7B is a diagram illustrating a misalignment determination process when a smoothing capacitor is charged.

If it is determined that the DC power Pdc (or the AC power Pac1) exceeds the withstand power Pw in step S02, the first controller 25 performs input voltage control in addition to the frequency control (step S04). Here, the first controller 25 determines that the protection of the DC/AC converter 27 may be insufficient with only the frequency control, selects a voltage that does not place a strain on the DC/AC converter 27, and performs voltage adjustment control for decreasing the voltage of the AC power Pac1. Thereby, as illustrated in FIG. 7A, the DC power Pdc (or the AC power Pac1) becomes less than or equal to the withstand power Pw.

Subsequently, the first controller 25 acquires an electrical parameter detected by the first detector 23 (step S05). This electrical parameter includes the DC power Pdc (or the AC power Pac1) and/or a phase difference between a phase of the voltage Vac2 and a phase of the current Iac2. As described above, a highly accurate determination process becomes possible when the electric power or the phase difference clearly shows a difference in value in accordance with a magnitude of the amount of misalignment.

If a resonance capacitor or a resonance inductor is provided between the DC/AC converter 27 and the first coil 21, the electrical parameter may be a voltage or a current of the resonance capacitor or the resonance inductor. With respect to a resonance capacitor and a resonance inductor, it may be possible to clearly show a difference in a value according to a magnitude of the amount of misalignment on the basis of a circuit topology of the first coil. Consequently, a highly accurate determination process becomes possible.

Next, the first controller 25 performs a determination process of determining whether or not the second coil 31 is located in a desired range (step S06). When the phase difference is used as the electrical parameter, the first controller 25 determines that the second coil 31 is located within the desired range if the phase difference is greater than or equal to a predetermined value or less than or equal to the predetermined value. This predetermined value is, for example, the above-mentioned threshold value (see FIG. 5A). When the DC power Pdc (or the AC power Pac1) is used as the electrical parameter, the first controller 25 determines that the second coil 31 is in the desired range if the DC power Pdc is greater than or equal to a predetermined value or less than or equal to the predetermined value. This predetermined value is, for example, the above-mentioned threshold value (see FIG. 4A). When the resonance capacitor (or the resonance inductor) is provided, the first controller 25 determines that the second coil 31 is in a desired range if the voltage of the resonance capacitor is greater than or equal to a predetermined value or less than or equal to the predetermined value. Alternatively, if the current of the resonance capacitor is greater than or equal to a predetermined value or less than or equal to the predetermined value, the first controller 25 determines that the second coil 31 is located in the desired range.

If it is determined that the second coil 31 is located within the desired range in step S06, the first controller 25 controls the power transmitter 2 so that power transmission is performed for the power receiver 3 (step S07). If it is determined that the second coil 31 is located outside the desired range in step S06, the first controller 25 controls the power transmitter 2 so that no power transmission is performed for the power receiver 3 (power transmission is stopped) (step S08).

Following the determination processing in step S06, the first controller 25 may calculate the amount of misalignment of the second coil 31 on the basis of a pre-stored threshold value or table. The first controller 25 may transmit the calculated amount of misalignment to the power receiver 3 side via the first communication unit 24 and the second communication unit 34 or may display the amount of misalignment on the power transmitter 2 or the power receiver 3.

According to a series of control and processing described above, in the wireless power feeding system 1, the DC power input to the DC/AC converter 27 does not exceed the withstand power of the DC/AC converter 27 and electric power can be efficiently supplied from the power transmitter 2 to the power receiver 3.

According to the power transmitter 2 of the present embodiment, the first controller 25 performs frequency control on the DC/AC converter 27 at a frequency at which the DC power Pdc is less than or equal to the withstand power Pw of the DC/AC converter 27 regardless of the amount of misalignment. Because the frequency control is performed so that the input power is less than or equal to the withstand power Pw of the DC/AC converter 27 regardless of any amount of misalignment (for example, even when there is no second coil), it is possible to prevent a size of the DC/AC converter from being increased.

Also, the electrical parameter within the power transmitter 2 has a correlation with the frequency of the AC power Pac2 in accordance with a magnitude of an amount of misalignment. By performing the determination process by the first controller 25, it is possible to determine whether or not the second coil 31 is located in a desired range.

The first controller 25 selects a frequency at which a detected value of the electrical parameter increases or decreases as the amount of misalignment increases. Consequently, the directionality corresponds to a change in the amount of misalignment and a change in the electrical parameter. By comparing the detected value with a predetermined value (a threshold value), it can be easily determined whether or not the second coil 31 is located in a desired range.

The first controller 25 performs voltage adjustment control for lowering the voltage of the DC power Pdc, so that the DC power Pdc can be reliably set to the withstand power Pw or less even when the DC power Pdc cannot be sufficiently suppressed by the frequency control. When the selection range of the frequency range is limited as described above, reliable and flexible control is possible by using such voltage adjustment control together with the frequency control.

The first controller 25 estimates an amount of misalignment corresponding to the detected value by referring to the table indicating a correspondence relationship between the amount of misalignment and the detected value of the electrical parameter. Consequently, it is possible to estimate not only whether or not the second coil 31 is located in a desired range, but also to estimate an amount of misalignment of the second coil 31 with respect to the second coil 31, and it is possible to further identify an amount of misalignment.

Figure 7B:
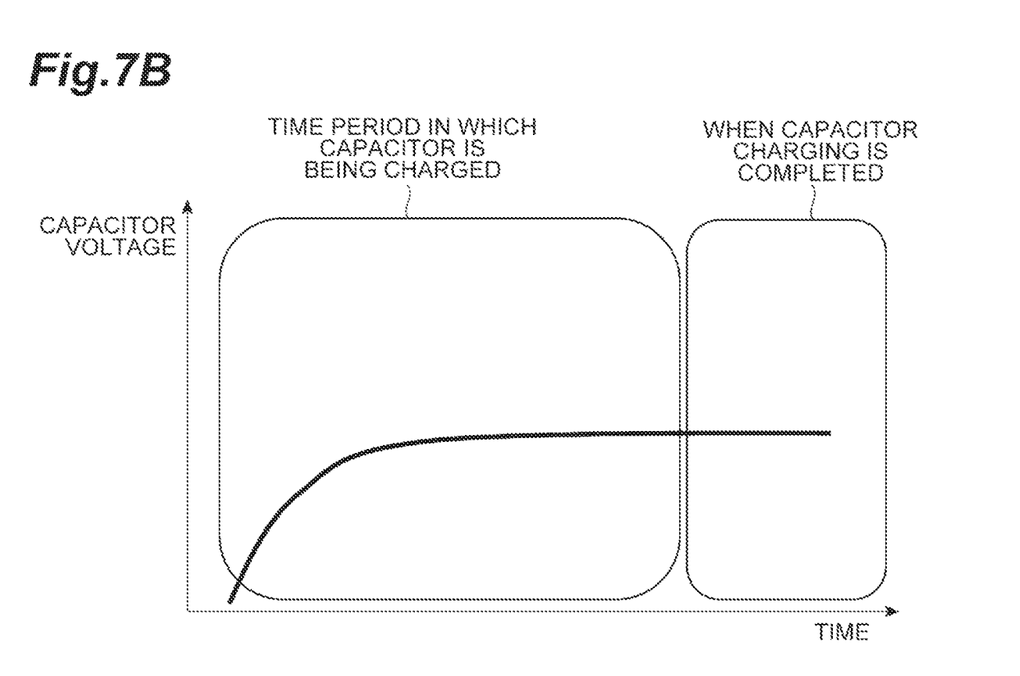

Although embodiments of the present disclosure have been described, the present invention is not limited to the above embodiments. For example, as illustrated in FIG. 7B, the power transmitter 2 may further include a smoothing capacitor at the input of the DC/AC converter 27. In the above embodiment, the input of the DC/AC converter 27 is between the power converter 26 and the DC/AC converter 27. In this case, the first controller 25 may perform the frequency control and the determination process before the smoothing capacitor is fully charged.

In the case of a power supply device, the DC smoothing capacitor of the DC/AC converter 27 and the power converter 26 is charged before an operation, and the operation is started. The first controller 25 selects a frequency and drives the DC/AC converter 27 at the frequency, so that it is also possible to detect a misalignment at a timing when a capacitor is charged. That is, it is possible to determine whether or not the second coil 31 is located in a desired range by effectively utilizing a time before a charging operation on the load L is started. Also, the DC power Pdc at the timing when the capacitor is charged is lower than the DC power Pdc when the smoothing capacitor is fully charged. Thus, it is possible to obtain an advantageous effect similar to that of the voltage adjustment control without executing the above-described voltage adjustment control. As illustrated in FIG. 7B, the voltage (the voltage Vdc) of the smoothing capacitor increases during a time period when the smoothing capacitor is being charged. In this case, the first controller 25 may store a threshold value for each voltage value during this increase and use each threshold value for the determination process. Also, the smoothing capacitor provided between the power converter 26 and the DC/AC converter 27 is not limited to a capacitor separate from the power converter 26 and the DC/AC converter 27, and may be implemented as a part of the power converter 26 or the DC/AC converter 27b. Furthermore, the smoothing capacitor may be implemented by dividing it into two in a stage (output) subsequent to the power converter 26 and a stage (input) previous to the DC/AC converter 27b. In this case, the timing when the capacitor is charged is a timing when one of the two smoothing capacitors is not fully charged.

Also, although a case in which the power source PS is an AC power source has been described in the above embodiment, the present invention is not limited to this mode. The power source PS may be a DC power source, and may be, for example, a photovoltaic power generation device or a power storage device. If the power source PS is a DC power source, the power converter 26 of the above embodiment can be omitted. Also, the power converter 26 may be a DC/DC converter. The DC/DC converter may be, for example, a non-insulation type circuit using a chopper circuit or an insulation type circuit using a transformer. Also, if the power source PS is a DC power source, DC power output from the power source PS instead of the AC power Pac1 is included as the electrical parameter measured by the first detector 23.

INDUSTRIAL APPLICABILITY

According to some aspects of the present disclosure, a size of a DC/AC converter is not increased and DC power input to the DC/AC converter does not exceed withstand power of the DC/AC converter.

REFERENCE SIGNS LIST

1 Wireless power feeding system
2 Power transmitter

3 Power receiver
21 First coil
22 First converter (converter)
23 First detector (detector)
24 First communication unit
25 First controller (controller)
26 Power converter
27 DC/AC converter
31 Second coil
32 Second converter
33 Second detector
34 Second communication unit
35 Second controller
Idc Current
Iac2 Current
Pac1 AC power
Pac2 AC power
Pac3 AC power
Pdc DC power
PS Power source (AC power source)
Pw Withstand power
Vac1 Voltage
Vac2 Voltage
Vdc Voltage

The invention claimed is:

1. A power transmitter for supplying a power receiver with power, the power transmitter comprising:
a first coil configured to wirelessly transmit power to a second coil of the power receiver;
a direct current (DC)/alternating current (AC) converter configured to convert DC power into AC power and supply the AC power to the first coil;
a controller configured to perform frequency control for selecting a frequency of the AC power,
wherein the controller at least selects the frequency so that the DC power is less than or equal to withstand power of the DC/AC converter regardless of an amount of misalignment of the second coil with respect to the first coil;
a smoothing capacitor provided at an input of the DC/AC converter; and,
wherein the controller performs the frequency control before the smoothing capacitor is fully charged.

2. The power transmitter according to claim 1, further comprising:
a detector configured to detect an electrical parameter within the power transmitter,
wherein the controller selects a frequency at which a detected value of the electrical parameter increases or decreases as the amount of misalignment increases.

3. The power transmitter according to claim 2, wherein the controller pre-stores a correspondence relationship between the amount of misalignment and a detected value of the electrical parameter as a table and estimates the amount of misalignment corresponding to the detected value by referring to the table.

4. The power transmitter according to claim 2, further comprising:
a power converter configured to convert power supplied from a power source into the DC power,
wherein the controller performs voltage adjustment control for causing a voltage of the DC power to be decreased in addition to the frequency control so that the DC power is less than or equal to the withstand power of the DC/AC converter regardless of the amount of misalignment of the second coil with respect to the first coil.

5. The power transmitter according to claim 4, further comprising:
a detector configured to detect an electrical parameter within the power transmitter, wherein the controller pre-stores a correspondence relationship between the amount of misalignment and a detected value of the electrical parameter as a table and estimates the amount of misalignment corresponding to the detected value by referring to the table.

6. The power transmitter according to claim 1, further comprising:
a power converter configured to convert power supplied from a power source into the DC power,
wherein the controller performs voltage adjustment control for causing a voltage of the DC power to be decreased in addition to the frequency control so that the DC power is less than or equal to the withstand power of the DC/AC converter regardless of the amount of misalignment of the second coil with respect to the first coil.

7. The power transmitter according to claim 6, further comprising:
a detector configured to detect an electrical parameter within the power transmitter,
wherein the controller pre-stores a correspondence relationship between the amount of misalignment and a detected value of the electrical parameter as a table and estimates the amount of misalignment corresponding to the detected value by referring to the table.

8. The power transmitter according to claim 6, wherein the controller performs the voltage adjustment control when or if the controller determines the DC power exceeds the withstand power even if or when the controller performs the frequency control.

9. The power transmitter according to claim 1, further comprising:
a detector configured to detect an electrical parameter within the power transmitter,
wherein the controller pre-stores a correspondence relationship between the amount of misalignment and a detected value of the electrical parameter as a table and estimates the amount of misalignment corresponding to the detected value by referring to the table.

* * * * *